United States Patent
Braun et al.

(10) Patent No.: US 8,985,198 B2
(45) Date of Patent: Mar. 24, 2015

(54) STACKED/BAR PLATE CHARGE AIR COOLER INCLUDING INLET AND OUTLET TANKS

(75) Inventors: Jason J. Braun, Franksville, WI (US); Kevin G. Clabots, Muskego, WI (US); Be A. Ware, Milwaukee, WI (US); Joey D. Brown, Lawrenceburg, TN (US); David E. Janke, Racine, WI (US); Robert M. Melby, Racine, WI (US)

(73) Assignee: Modine Manufacturing Company, Racine, WI (US)

( * ) Notice: Subject to any disclaimer, the term of this patent is extended or adjusted under 35 U.S.C. 154(b) by 925 days.

(21) Appl. No.: 12/560,696

(22) Filed: Sep. 16, 2009

(65) Prior Publication Data
US 2010/0096101 A1    Apr. 22, 2010

Related U.S. Application Data (63) Continuation-in-part of application No. 11/838,809, filed on Aug. 14, 2007, now abandoned.

(60) Provisional application No. 60/838,740, filed on Aug. 18, 2006.

(51) Int. Cl.
*F28D 1/02*  (2006.01)
*F02B 29/04*  (2006.01)
(Continued)

(52) U.S. Cl.
CPC .......... *F02B 29/0462* (2013.01); *F28D 9/0043* (2013.01); *F28D 9/0056* (2013.01); *F28D 2021/0082* (2013.01); *F28F 9/00* (2013.01); *Y02T 10/146* (2013.01)
USPC .............. 165/153; 165/81; 165/149; 165/167

(58) Field of Classification Search
CPC ... F28D 9/0056; F28D 9/0043; F28D 9/0006; F28D 1/0325; F28D 1/0333; F28D 1/0366; F28D 1/0341; F28D 1/035; F28F 3/086

USPC .......... 165/149, 153, 152, 167, 81, DIG. 359, 165/170, 157, 166
See application file for complete search history.

(56) References Cited

U.S. PATENT DOCUMENTS 2,221,937 A * 11/1940 Astle .............................. 165/70
3,334,399 A * 8/1967 Teeguarden ............. 29/890.039
(Continued)

FOREIGN PATENT DOCUMENTS

DE    2655017    6/1978
DE    2923852    12/1979
(Continued)

OTHER PUBLICATIONS

PCT/US2010/039353 International Search Report and Written Opinion date Mar. 2, 2011 (6 pages).
(Continued)

*Primary Examiner* — Tho V Duong
(74) *Attorney, Agent, or Firm* — Michael Best & Friedrich LLP (57) ABSTRACT

The present invention provides a charge air cooler for transferring heat between a coolant and charge air including a charge air inlet tank, a charge air outlet tank spaced from the inlet tank, a housing connecting the inlet and outlet tanks to define a charge air flow path from the inlet tank to the outlet tank, and a plurality of plate pairs extending into the charge air flow path from, and substantially perpendicular to, a first wall of the housing. Each of the plate pairs can define a multi-pass path for the coolant. Elongated spacers can be positioned between adjacent plate pairs to define the first wall of the housing. The housing can include a second wall opposite the first wall, and the plate pairs can be spaced away from the second wall in order to accommodate differences in thermal expansion between the plate pairs and the housing.

24 Claims, 7 Drawing Sheets

(51) Int. Cl.
*F28D 9/00* (2006.01)
*F28F 9/00* (2006.01)
*F28F 7/00* (2006.01)
*F28D 21/00* (2006.01)

(56) References Cited

U.S. PATENT DOCUMENTS

| | | | | |
|---|---|---|---|---|
| 3,490,522 | A | * | 1/1970 | Bizzarro ........................ 165/166 |
| 3,759,323 | A | * | 9/1973 | Dawson et al. ............... 165/166 |
| 4,217,953 | A | | 8/1980 | Sonoda et al. |
| 4,236,492 | A | | 12/1980 | Tholen |
| 4,253,520 | A | | 3/1981 | Friedericy et al. |
| 4,872,578 | A | | 10/1989 | Fuerschbach et al. |
| 4,890,670 | A | * | 1/1990 | Schiessl ......................... 165/76 |
| 5,125,453 | A | | 6/1992 | Bertrand et al. |
| 6,026,894 | A | | 2/2000 | Bachinger |
| 6,173,758 | B1 | | 1/2001 | Ward et al. |
| 6,199,626 | B1 | * | 3/2001 | Wu et al. ........................ 165/167 |
| 6,241,011 | B1 | | 6/2001 | Nakamura et al. |
| 6,250,380 | B1 | | 6/2001 | Strahle et al. |
| 6,298,910 | B1 | | 10/2001 | Komoda et al. |
| 6,516,874 | B2 | | 2/2003 | Mathur et al. |
| 6,530,423 | B2 | | 3/2003 | Nakado et al. |
| 6,574,950 | B2 | * | 6/2003 | Nash .......................... 60/39.511 |
| 6,688,292 | B2 | | 2/2004 | Ruppel et al. |
| 6,755,158 | B2 | | 6/2004 | Knecht et al. |
| 7,036,565 | B2 | | 5/2006 | Brost et al. |
| 2002/0014326 | A1 | * | 2/2002 | Nakado et al. ................ 165/153 |
| 2004/0149425 | A1 | * | 8/2004 | Abiko et al. ................... 165/166 |
| 2005/0077033 | A1 | * | 4/2005 | Schmalzried ................. 165/152 |
| 2005/0269066 | A1 | * | 12/2005 | Horiuchi et al. .............. 165/153 |
| 2006/0278377 | A1 | | 12/2006 | Martins et al. |
| 2008/0041556 | A1 | | 2/2008 | Braun et al. |
| 2008/0087410 | A1 | | 4/2008 | Muller-Lufft et al. |
| 2010/0096101 | A1 | | 4/2010 | Braun et al. |

FOREIGN PATENT DOCUMENTS

| | | | |
|---|---|---|---|
| DE | 19962391 | | 6/2001 |
| DE | 102005042359 | | 3/2007 |
| EP | 0522471 | | 1/1993 |
| EP | 1279805 | | 1/2003 |
| EP | 1491837 | | 12/2004 |
| GB | 2023797 | | 1/1980 |
| GB | 2275995 A | * | 9/1994 |
| JP | 11311489 | | 11/1999 |
| JP | 2001088538 | | 4/2001 |
| JP | 2008096047 | | 4/2008 |

OTHER PUBLICATIONS

USPTO Office Action for U.S. Appl. No. 11/838,809, dated Aug. 31, 2010, (12 pages).

* cited by examiner

STACKED/BAR PLATE CHARGE AIR COOLER INCLUDING INLET AND OUTLET TANKS

CROSS-REFERENCE TO RELATED APPLICATIONS

The present application is a continuation-in-part of co-pending Application Ser. No. 11/838,809, filed Aug. 14, 2007, which claims the benefit of U.S. Provisional Patent Application Ser. No. 60/838,740, filed Aug. 18, 2006, and the entire contents of both of these applications is hereby incorporated by reference.

FIELD OF THE INVENTION

The present invention relates to a heat exchanger and a method of manufacturing a heat exchanger, and more particularly to a charge air cooler and a method of manufacturing a charge air cooler.

SUMMARY

There is always a need for improvements in heat exchangers. One current area in need of improvement is for charge air coolers that can provide acceptable performance in connection with low coolant flow rates that are typical in low temperature coolant circuits such as are expected to become increasingly common for some engine applications (e.g., diesel engine applications) that will be required to meet increasingly demanding emission compliance strategies.

In some embodiments, the present invention provides a heat exchanger that is of particular use as a charge air cooler in engine systems having low coolant flow rates that are typical in low temperature coolant circuits. The heat exchanger utilizes a combination of bar-plate design and stacked plate design together with inlet and outlet tanks to eliminate air bypass around the core to the cooler while providing a highly manufacturable cooler. The design also allows for different core stack heights for different applications by changing the quantity of the components for the core without requiring any significant change to the component parts of the core. The design further can provide particular advantages wherein the core components, and potentially other components, of the heat exchanger are made from aluminum.

In some embodiments, the invention provides a charge air cooler for transferring heat between a coolant and charge air. The cooler can include a heat exchange core including a stack of embossed plate pairs. Each plate pair can define a circuitous or serpentine coolant flow path through the heat exchange core. The heat exchange core can also include a number of elongated spacers interleaved with the plate pairs to define charge air flow paths between adjacent plate pairs through the heat exchange core. The charge air cooler can also include a charge air inlet tank connected to a first side of the heat exchange core to direct the charge air into the charge air flow paths and a charge air outlet tank connected to a second side of the heat exchange core to collect the charge air from the charge air flow paths.

In other embodiments, the present invention provides a charge air cooler including a charge air inlet tank, a charge air outlet tank spaced from the inlet tank, and a heat exchange core positioned between the inlet and outlet tanks and including a stack of plate pairs. Each of the plate pairs can define a multi-pass path for the coolant. First and second elongated spacers can be positioned between adjacent plate pairs and can extend between the inlet tank and the outlet tank on opposite sides of the heat exchange core to define flow paths for the charge air through the heat exchange core.

In some embodiments, the invention provides a charge air cooler including a charge air inlet tank having a charge air inlet port, a charge air outlet tank having a charge air outlet port, a housing connecting the charge air inlet tank and charge air outlet tank to define a charge air flow path from the charge air inlet port to the charge air outlet port, and a plurality of plate pairs extending into the charge air flow path from, and substantially perpendicular to, a first wall of the housing. Each of the plate pairs can define a multi-pass path for the coolant. Elongated spacers can be positioned between adjacent plate pairs to define the first wall of the housing. The housing can include a second wall opposite the first wall, and the plate pairs can be spaced away from the second wall in order to accommodate differences in thermal expansion between the plate pairs and the housing.

The present invention also provides a method of assembling a charge air cooler, the method comprising the acts of embossing a plurality of plates, stacking the plurality of plates in plate pairs such that embossments of each plate pair at least partially define a flow path for a coolant, interleaving a plurality of elongated spacers between the plate pairs, securing a charge air inlet tank to the stacked plate pairs to receive the charge air and to distribute the charge air to flow paths defined between adjacent plate pairs, and securing a charge air outlet tank to the assembled plate pairs to receive the charge air from the flow paths. In some embodiments, the method may comprise the additional act of securing a wall between the charge air inlet and outlet tanks to further define the flow paths between adjacent plate pairs.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Also, it is to be understood that phraseology and terminology used herein with reference to device or element orientation (such as, for example, terms like "central," "upper," "lower," "front," "rear," and the like) are only used to simplify description of the present invention, and do not alone indicate or imply that the device or element referred to must have a particular orientation. In addition, terms such as "first" and "second" are used herein for purposes of description and are not intended to indicate or imply relative importance or significance.

Figure 1:
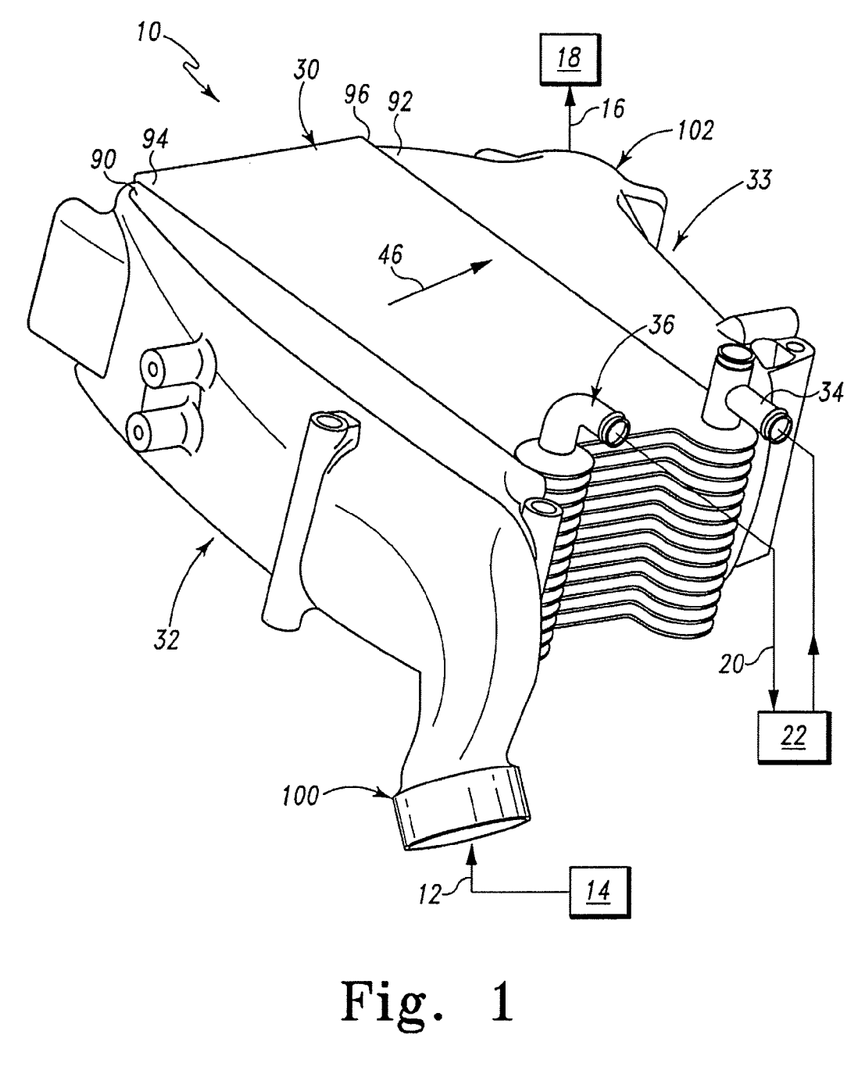
FIG. 1 is a perspective view of a heat exchanger according to some embodiments of the present invention.
Figure 2:
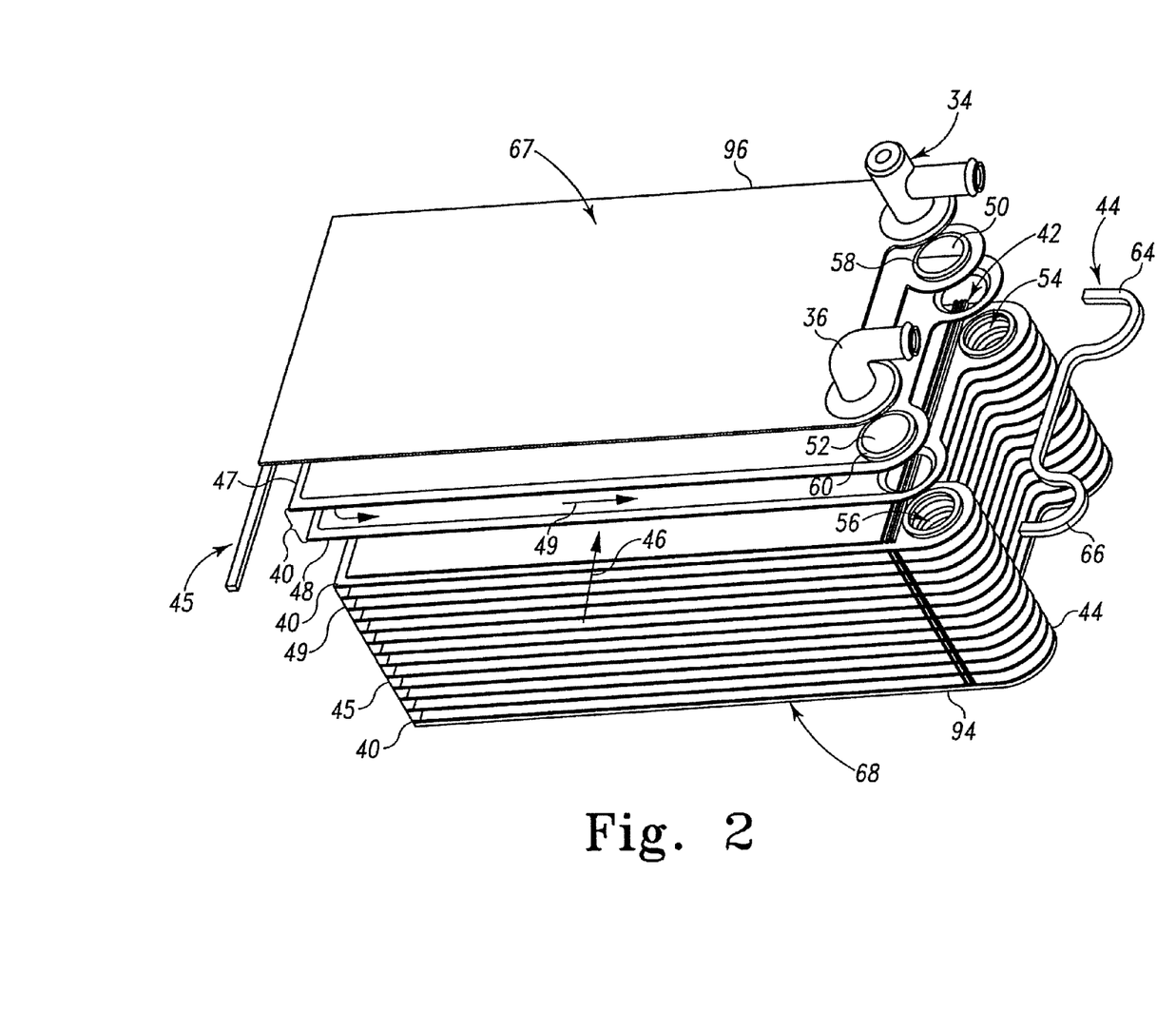
FIG. 2 is a partially exploded, perspective view of the heat exchanger shown in FIG. 1.

In the illustrated embodiment of FIGS. 1 and 2, the heat exchanger 10 is a charge air cooler configured to receive a charge air flow 12 from a charge air compressor 14 and to supply a cooled charge air flow 16 for combustion in an engine 18 after having transferred heat from the charge air flow 12 to a coolant flow 20 provided by a coolant system 22 associated with the engine 18. There are many conventional and known types of charge air compressors 14 (e.g., so-called "turbochargers"), combustion engines 18, and coolant systems 22 that are commonly employed in vehicles and other application, all of which are acceptable for use with the heat exchanger 10 of the present invention. Accordingly, further description of the components 14, 18, and 22 will not be provided herein.

As shown in FIGS. 1 and 2, the heat exchanger 10 can include a core 30, a change air inlet tank 32 connected to one side of the core 30 to direct the charge air flow 12 into the core 30, and a charge air outlet tank 33 connected to the opposite side of the core 30 to receive the cooled charge air flow 16 therefrom and direct the charge air flow to the engine 18. In other embodiments, the charge air inlet and outlet tanks 32, 33 can be located on the same side of the core 30. In some such embodiments, the charge air inlet and outlet tanks 32, 33 can be integrally formed and can include one or more internal partitions for defining inlet and outlet portions of the integral tank. In other embodiments, the charge air inlet and outlet tanks 32, 33 can be located on adjacent sides of the core 30 (e.g., on top and left sides, bottom and left sides, front and left sides, etc.).

The core 30 can include one or more coolant inlet ports 34 and one or more coolant outlet ports 36 to direct coolant flow into and out of the core 30. In the illustrated embodiment of FIGS. 1 and 2, the core 30 includes a single inlet port 34 and a single outlet port 36 located on a common side of the core 30 so as to provide a counterflow relationship between the coolant flow 20 and the charge air flow 12 through the core 30. In other embodiments, the core 30 can include two or more of each of the inlet and outlet ports 34, 36 and/or the inlet and outlet ports 34, 36 can be located on a common side of the core 30, or alternatively, the inlet and outlet ports 34, 36 can be located on different sides of the core 30. In some such embodiments, the inlet and outlets 34, 36 can be oriented so as to provide a crossflow or a parallel flow relationship between the coolant flow 20 and the charge air flow 12 through the core 30.

In the illustrated embodiment of FIGS. 1 and 2, the core 30 includes a number of stacked plate pairs 40 (14 in the illustrated embodiment) with air side fins 42 and elongated spacer bars 44, 45 interleaved between adjacent plate pairs 40 to define the air flow paths 46 through the core 30. In the illustrated embodiment, one air side fin 42 is supported between each adjacent plate pair 40, and between a pair of spacer bars 44, 45, which seal opposite ends of the heat exchanger core 30. In other embodiments, two or more air side fins 42 can be supported between adjacent plate pairs 40, the core 30 can include one or more pairs of adjacent plate pairs 40 not having an air side fin 42 and/or a spacer bar 44 located therebetween, a single spacer bar 44 can be located between one or more adjacent plate pairs 40, a pair of spacer bars 44, 45 can seal adjacent sides of the heat exchanger core 30, and/or three or four spacer bars 44 can be located between adjacent plate pairs 40. While a serpentine or corrugated type fin 42 is shown (only the ends are actually illustrated for simplicity) for the air side fin 42, in some embodiments the core 30 can include one or more fins 42 having other configurations, such as, for example, lanced and offset, louvered, and the like.

As shown in FIG. 2, the spacer bars 44, 45 can each have a substantially square cross-sectional shape. In other embodiments, the spacer bars 44, 45 can have a different cross sectional shape, such as, for example, round, triangular, wedge, rectangular, trapezoidal, or any other polygonal shape, oval, irregular, and the like.

In still other embodiments, the core 30 can include a single plate folded or rolled over onto itself so that opposite ends of the of the plate contact one another and so that the single plate substantially encloses a coolant flow path 49 and maintains coolant in the coolant flow path 49 separate from the air flow paths 46. In some such embodiments, the core 30 can include a number of adjacent folded or rolled plates, each of which can define a separate coolant flow path 49, and spacer bars 44 and/or air side fins 42 can be supported in the core 30 between adjacent folded or rolled plates.

Figure 3:
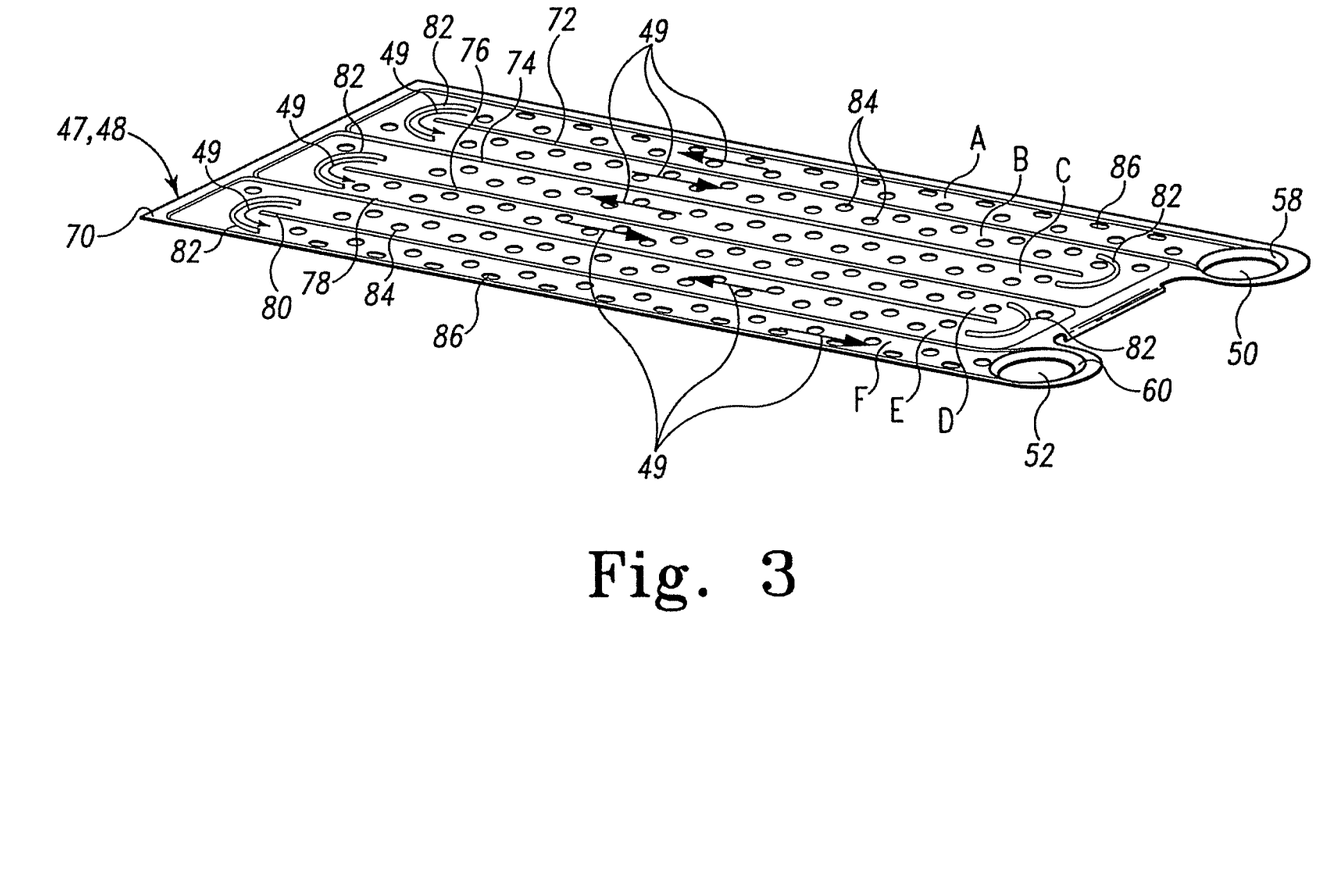
FIG. 3 is a perspective view of a plate utilized in the heat exchanger shown in FIG. 1.

In the illustrated embodiment of FIGS. 1-3, each of the plate pairs 40 is formed from a pair of stamped or embossed plates 47, 48 that are joined at their periphery so as to enclose and define a coolant flow path 49 (best seen in FIG. 3) for the coolant therebetween. Each of the plates 47, 48 includes a pair of openings 50, 52 that are aligned with the corresponding openings 50, 52 of the other plates in order to define respective coolant manifolds 54, 56 for distributing and collecting the coolant to and from the flow paths 49. In this regard, each of the openings 50, 52 is surrounded by a corresponding raised boss 58, 60, respectively, that faces outwardly from each plate pair 40 to mate with an adjacent aligned boss 58, 60 in order to seal the corresponding manifolds 54, 56. In alternative embodiments, inserts can be positioned between each of the openings 50, 52 to at least partially enclose one or both of the coolant manifolds 54, 56. Alternatively, the spacer bars 44, 45 can be shaped to surround the openings 50, 52 so as to form a seal between adjacent plate pairs 40 and to at least partially define one or both of the coolant manifolds 54, 56.

In the illustrated embodiment of FIGS. 1-3, a pair of coolant manifolds 54, 56 are located on a common side of the heat exchanger core 30. In other embodiments, the core 30 can include a single manifold having an internal partition, or alternatively, the core 30 can include two or more manifolds 54, 56 located on different sides of the heat exchanger core 30.

As shown in FIG. 2, each spacer bar 44, 45 can be shaped so as to conform to the corresponding end periphery of the adjacent stacked plate pairs 40. In the illustrated embodiment of FIG. 2, the spacer bars 44 located on one side of the core 30 (i.e., the right side in FIG. 2) include contoured portions 64, 66 that wrap around the correspondingly contoured bosses 58, 60 of the adjacent plate pairs 40 so as to seal the air side of the core 30 of the corresponding end of the core 30. As shown in FIG. 2, the spacer bars 45 located on the opposite side of the core 30 (i.e., the left side in FIG. 2) can have a shape correspond to the ends of the adjacent plate pairs 40 so as to seal the air side of the core 30 at the corresponding end of the core 30. While the spacer bars 44, 45 of the illustrated embodiment of FIG. 2 are differently shaped to seal differently shaped sides of the core 30, in other embodiments, the spacer bars 44, 45 can be similarly shaped to engage similarly shaped sides of the core 30. In some such embodiments, common spacer bars can be located on opposed sides of the core 30, eliminating the need for differently shaped spacer bars 44, 45 and simplifying assembly of the core 30.

The core 30 can also include a top plate 67 and a bottom plate 68 that sandwich the plate pairs 40 and interleaved fins 42 and spacer bars 44, 45 therebetween. In the illustrated embodiment, the top plate 67 has a pair of openings for receiving the ports 34, 36, while the bottom plate 68 does not have any openings so as to enclose the manifolds 54, 56. In other embodiments, one of the ports 34, 36 (e.g., the inlet port 34) can extend through an opening in the top plate 67 and the other port 34, 36 (e.g., the outlet port 36) can extend through an opening in the bottom plate 68, or alternatively, both ports 34, 36 can extend through the bottom plate 68.

In the illustrated embodiment of FIG. 2, the top plate 67 engages an upper-most plate pair 40 and the bottom plate 68 engages a lower-most plate pair 40. In other embodiments, a fin 42 can be supported between the top plate 67 and the upper-most plate pair 40 and/or a fin 42 can be supported between the lower-most plate pair 40. In still other embodiments, the top plate 67 can be eliminated and the upper-most plate pair 40 can define a top of the core 30 and/or the bottom plate 68 can be eliminated and the lower-most plate pair 40 can define the bottom of the core 30.

In the illustrated embodiment of FIG. 3, each of the plates 47, 48 includes a peripheral embossment 70 and a plurality of longitudinal embossments 72, 74, 76, 78, and 80, that extend interior from the peripheral embossment 70 to cooperate with the other plate 47, 48 of the plate pair 40 to define the coolant flow paths 49 with multiple passes A, B, C, D, E, and F to create a cross flow with the charge air flow paths 46 through the core 30. Additionally, curved embossments 82 are provided between adjacent ends of the passes A-E to help direct the coolant flow from one pass to the next with an even distribution of the coolant flow. As shown in FIG. 3, the longitudinal embossments 72, 74, 76, 78, and 80 and the curved embossments 82 define a circuitous coolant flow path 49 through each of the plate pairs 40. In other embodiments, one or both of the plates 47, 48 can have embossments having other configurations and relative orientations to provide a circuitous coolant flow path 49. In still other embodiments, one or both of the plates 47, 48 can have other longitudinal protrusions and/or curved protrusions, one or more of which can be welded, soldered, or brazed to one or both of the plates 47, 48 to at least partially define the coolant flow path 49.

In some embodiments one or both of the plates 47, 48 can include a number of raised dimple-shaped embossments 84, 86 to strengthen the connection between the plates 47, 48 and/or act as turbulators for the coolant flow. While one preferred form is shown for the plates 47, 48, it should be appreciated that there are many possible forms for the plates 47, 48 and that the particular form selected will depend upon a number of parameters for each specific application. For example, in some applications, fewer, or more, of the multiple passes A-F may be desired. Similarly, in some applications, the embossments 82, 84, and 86 may desirably be eliminated, or modified.

As shown in FIGS. 1 and 2, the charge air inlet and charge air outlet tanks 32, 33 each have a peripheral rim 90, 92, respectively, that correspond to and mates with the air side peripheries 94, 96, respectively, of the core 30 defined by edges of the top and bottom plates 67, 68, the spacer bars 44, 46, and the corresponding ends of the plate pairs 40 that surround the inlet and exit sides of the air flow paths 46 through the core 30. The corresponding peripheries 90, 94 and 92, 96 can bonded in a suitable fashion, such as by welding, soldering, or brazing, so as to seal the peripheries 90, 94 and 92, 96 together to prevent or restrict leakage of the charge air flow from the heat exchanger 10 and around the flow paths 46. In some embodiments, a seal or gasket can be positioned between the core 30 and the charge air inlet tank 32 and/or between the core 30 and the charge air outlet tank 34.

While the charge air inlet and charge air outlet tanks 32, 33 can be of any suitable construction, in the illustrated embodiment, the charge air inlet and charge air outlet tanks 32, 33 are shown as castings or moldings formed from a suitable material, with the charge air inlet tank 32 having a suitable air inlet port 100 formed thereon and the outlet tank 32 having a suitable outlet air port 102 formed thereon. In this regard, it is important to note that the use of the spacer bars 44, 46 helps to provide a peripheral surface so that the tanks 30, 32 can be mated and bonded in a suitable fashion with the core 30.

While any suitable material may be used for the heat exchanger 10, in some preferred embodiments it is desirable to form the tanks 32, 33 and the components for the core from aluminum and to bond all of the components of the heat exchanger 10 together using a suitable braze, welding, or soldering operation.

Figure 4:
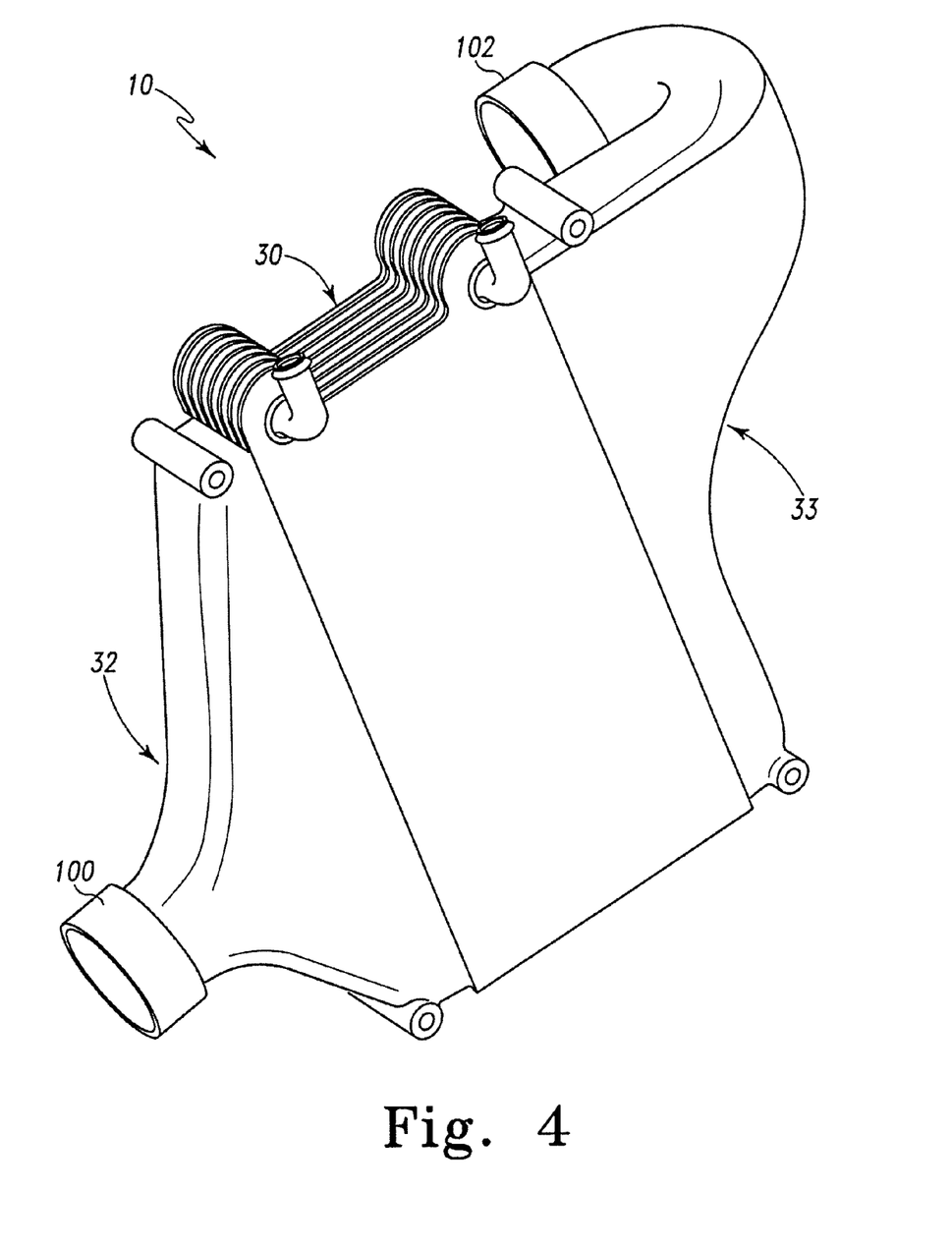
FIG. 4 is a view of an alternate embodiment of the heat exchanger of the present invention.

One advantage of the illustrated construction for the core 30 is that it can allow for different sizes of the heat exchanger 10 by simply adding or subtracting the number of plate pairs 40 and interleaved fins 42 and spacer bars 44, 45 without requiring a change in component configuration for the components of the core 30. This is illustrated in FIG. 4 which shows a core 30 formed from seven of the plate pairs 40 and a corresponding number of the interleaved fins 42 and spacer bars 44, 45. In this regard, it should be noted, that it is preferred that the charge air inlet tank 32 and charge air outlet tank 32 be sized so that their peripheries 90, 92 conform to the peripheries 94, 96 of the core 30.

Figure 5:
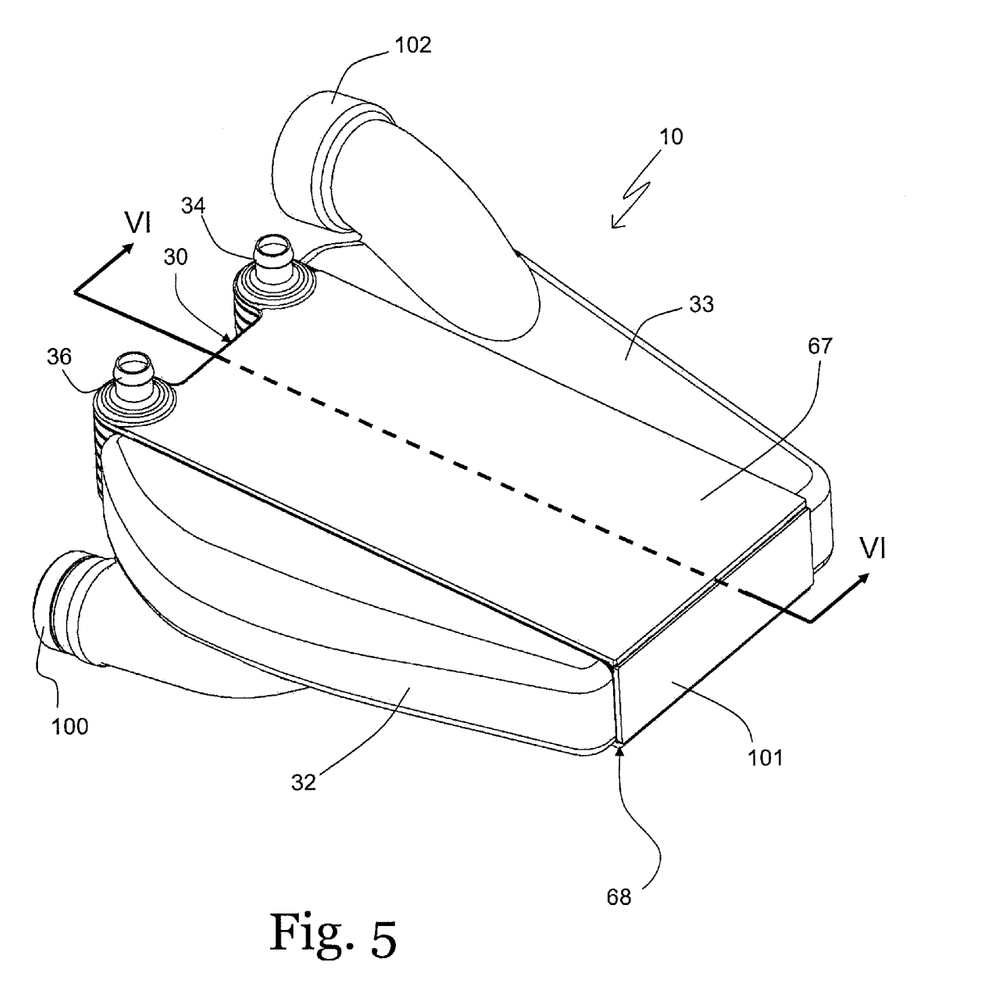
FIG. 5 is a perspective view of an alternate embodiment of the heat exchanger of the present invention.
Figure 6:
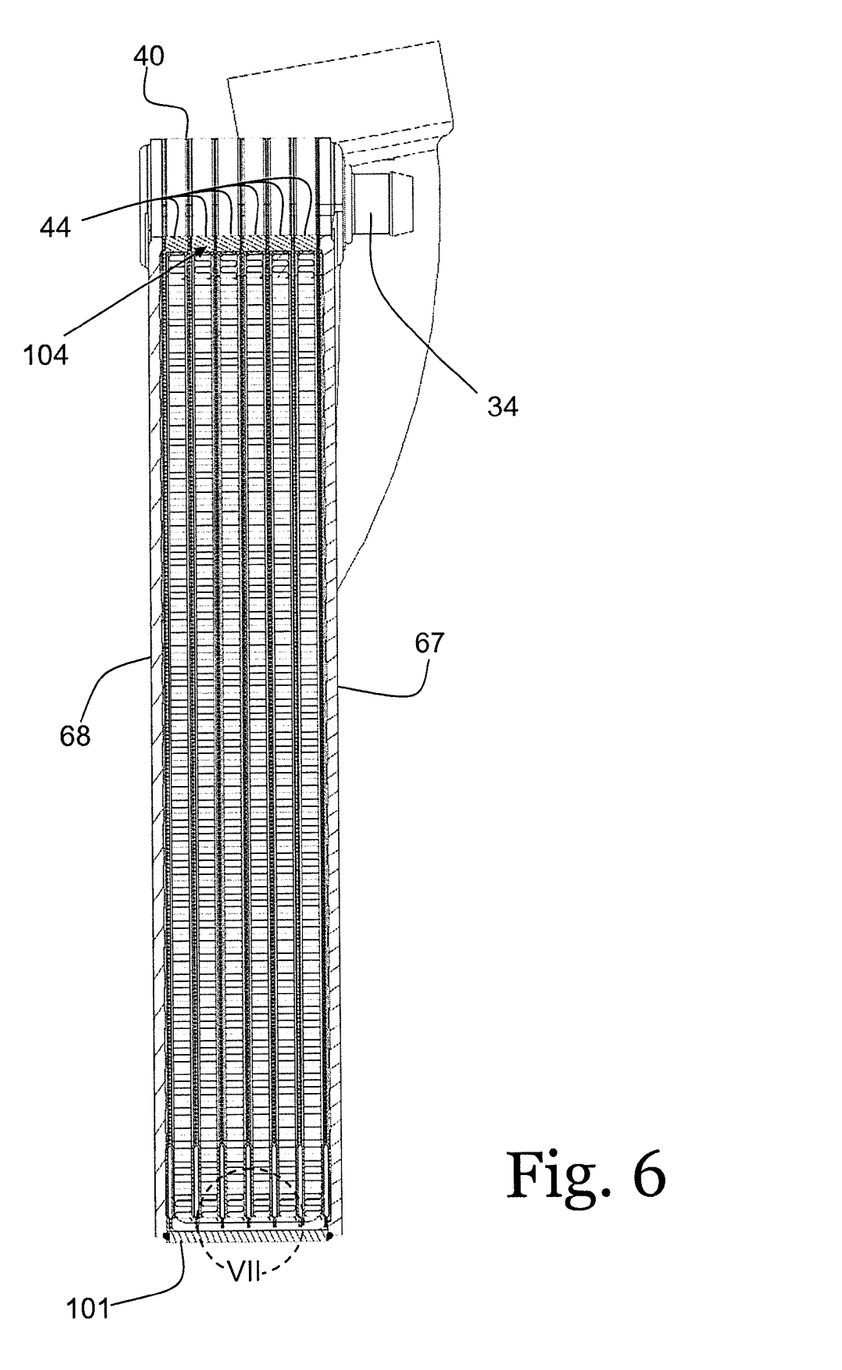
FIG. 6 is a section view along the line VI-VI in FIG. 5.
Figure 7:
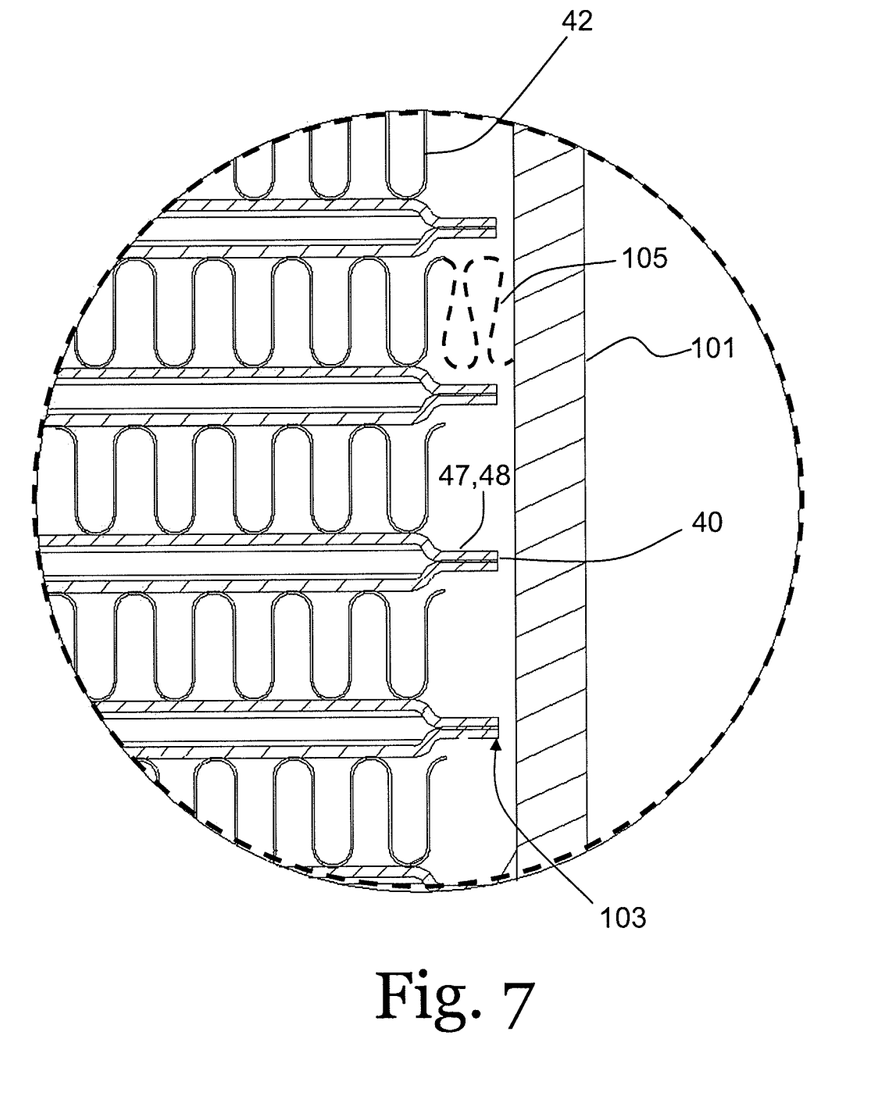
FIG. 7 is an enlarged view of the area bounded by line VII in FIG. 6.

In another embodiment of the invention, illustrated in FIGS. 5-7, the core 30 is assembled without elongated spacer bars 45 on one side of the core 30, while spacer bars 44 are included on an opposite side of the core 30. On the side without spacer bars 45, a side plate 101 is provided and is secured to the top plate 67 and the bottom plate 68, as well as to the charge air inlet tank 32 and the charge air outlet tank 33, in order to at least partially define the charge air flow path through the core 30. The wall 101 together with the top and bottom plates 67 and 68 and the wall 104 formed in part by the elongated spacer bars 44 comprise a housing enclosing the air flow paths 46 between the charge air inlet tank 32 and the charge air outlet tank 33. The plate pairs 40 extend into the air flow paths 46 from the wall 104, in a direction that is substantially perpendicular to the wall 104.

By securing the plate pairs 40 to the wall 104 but not to the wall 101, the plate pairs 40 can experience a thermal expansion that differs from the thermal expansion of the inlet tank 32 and/or the outlet tank 33. In some such embodiments, as best seen in FIG. 7, the side plate 101 may be spaced away from an edge 103 of a plate pair 40. This may be especially desirable when the heat exchanger 10 is utilized in an application where the plate pairs 40 would experience thermal expansion that exceeds the thermal expansion of the inlet tank 32 and/or the outlet tank 33.

As further shown in FIG. 7, it may be preferable in some embodiments for the air side fins 42 to extend beyond the edge 103 of the plate pairs 40. When the plate 101 is assembled into the heat exchanger 10, one or more of the convolutions 105 that are not bonded to the plates 47, 48 may be compressed to provide a region that has a substantially smaller percentage of open area in comparison to the air fin 42 in general. In this manner the flow of charge air along the wall 101 is discouraged, the charge air being directed instead through those portions of the air fins 42 that are immediately adjacent the coolant flow path 49. Such an extension of the air fins 42 may be applied to the fin 42 on a single layer, as shown in FIG. 7, or on multiple of the layers of air fins 42 in the heat exchanger core 30. Alternatively or in addition, the flow of air along the wall 101 may be discouraged by the inclusion of flow blocking features in the air inlet tank 32.

The embodiments described above and illustrated in the figures are presented by way of example only and are not intended as a limitation upon the concepts and principles of the present invention. As such, it will be appreciated by one having ordinary skill in the art that various changes are possible.

What is claimed is:

1. A heat exchanger comprising:
    a first inlet tank having a first fluid inlet port;
    a first outlet tank having a first fluid outlet port;
    a housing connecting the inlet tank and the outlet tank to at least partially define a first flow path between the first inlet port and the first outlet port; and
    a plurality of embossed plate pairs extending into the first flow path from and substantially perpendicular to a first wall of the housing, each plate pair defining a circuitous second flow path extending between a second inlet port and a second outlet port, the second inlet port in fluid communication with a second inlet tank and the second outlet port in fluid communication with a second outlet tank, the second inlet port and the second outlet port being formed by the plurality of plate pairs, the first flow path extending across each of the second flow paths;
    wherein said first wall of the housing comprises a plurality of elongated spacers interleaved with said plurality of embossed plate pairs, each of the spacers extending at least partially along an edge of one of the plates and at least partially around the second inlet port and the second outlet port, and
    wherein the plurality of embossed plate pairs are spaced away from a second wall of the housing opposite said first wall to accommodate differences in thermal expansion between the plurality of embossed plate pairs and the housing.

2. The heat exchanger of claim 1, wherein:
    the first fluid flow path provides a flow path for charge air;
    the second flow paths provide a flow path for a coolant; and
    heat is transferred from charge air traveling along the first flow path to the coolant traveling along the second flow paths.

3. The heat exchanger of claim 1, further comprising a corrugated fin structure positioned along the first flow path between two of the plate pairs, one of the plate pairs including a first plate at least partially bonded to said corrugated fin structure and an other of the plate pairs including a second plate at least partially bonded to said corrugated fin structure.

4. A heat exchanger comprising:
    an inlet tank having a fluid inlet port;
    an outlet tank having a fluid outlet port;
    a housing connecting the inlet tank and the outlet tank to at least partially define a first flow path between the inlet port and the outlet port; and
    a plurality of embossed plate pairs extending into the first flow path from and substantially perpendicular to a first wall of the housing, each plate pair defining a circuitous second flow path, the first flow path extending across each of the second flow paths;
    wherein said first wall of the housing comprises a plurality of elongated spacers interleaved with said plurality of embossed plate pairs;
    further comprising a corrugated fin structure positioned along the first flow path between two of the plate pairs, one of the plate pairs including a first plate at least partially bonded to said corrugated fin structure and an other of the plate pairs including a second plate at least partially bonded to said corrugated fin structure;
    wherein the plurality of embossed plate pairs are spaced away from a second wall of the housing opposite said first wall to accommodate differences in thermal expansion between the plurality of embossed plate pairs and the housing; and
    wherein at least one convolution of the corrugated fin structure is placed in a compressed state by contact with the second wall of the housing.

5. A method of assembling a charge air cooler, the method comprising the acts of:
    embossing a plurality of plates, the plates defining a coolant inlet port and a coolant outlet port, the coolant inlet port in fluid communication with a coolant inlet tank and the second outlet port in fluid communication with a coolant outlet tank;
    stacking the plurality of plates in plate pairs such that embossments of each plate pair at least partially define a coolant flow path;
    interleaving a plurality of elongated spacers between the plate pairs such that each of the spacers extends at least partially along an edge of one of the plates and at least partially around the coolant inlet port and the coolant outlet port;
    locating the stack of plate pairs between a top housing plate and a bottom housing plate;
    securing a charge air inlet tank to the top plate, the bottom plate and the elongated spacers to receive charge air and to distribute the charge air to flow paths defined between adjacent plate pairs; and
    securing a charge air outlet tank to the top plate, the bottom plate and the elongated spacers to receive the charge air from the flow paths.

6. The method of claim 5, further comprising forming a plurality of passes along the coolant flow path between the plate pairs and between the embossments.

7. The method of claim 6, wherein embossing the plurality of plates includes forming arcuately-shaped embossments along the plurality of plates to at least partially define the plurality of passes.

8. The method of claim 5, further comprising dimpling the plurality of plates between the embossments to form turbulators positioned along the coolant flow path.

9. The method of claim 5, wherein embossing the plurality of plates includes forming arcuately-shaped embossments formed along at least one of the embossed plate pairs to define a serpentine flow path.

10. The method of claim 5, further comprising positioning a corrugated fin between two of the plate pairs and along the charge air flow path.

11. The method of claim 5, wherein interleaving the plurality of elongated spacers between the plate pairs includes positioning the plurality of elongated spacers between the charge air inlet tank and the charge air outlet tank on at least one side of a heat exchange core formed by the stack of plate pairs.

12. The method of claim 5, wherein interleaving the plurality of elongated spacers between the plate pairs includes sealing opposite sides of the stacked plate pairs.

13. The method of claim 5, wherein the elongated spacers are located along a first edge of the stack of plate pairs, the method further comprising the acts of:
locating a side plate adjacent a second edge of the stack of plate pairs opposite the first edge;
securing the side plate to the top plate and the bottom plate;
securing the charge air inlet tank to the side plate; and
securing the charge air outlet tank to the side plate.

14. The method of claim 13, wherein securing the side plate to the top plate and the bottom plate includes creating a welded joint between the side plate and the top plate and creating a welded joint between the side plate and the bottom plate.

15. The method of claim 13, wherein securing the charge air inlet tank to the top plate, the bottom plate, the elongated spacers and the side plate includes creating a continuous welded joint around a periphery of the charge air inlet tank.

16. The method of claim 13, wherein securing the charge air outlet tank to the top plate, the bottom plate, the elongated spacers and the side plate includes creating a continuous welded joint around a periphery of the charge air outlet tank.

17. A method of assembling a charge air cooler, the method comprising the acts of:
embossing a plurality of plates;
stacking the plurality of plates in plate pairs such that embossments of each plate pair at least partially define a coolant flow path;
interleaving a plurality of elongated spacers between the plate pairs;
locating the stack of plate pairs between a top housing plate and a bottom housing plate;
securing a charge air inlet tank to the top plate, the bottom plate and the elongated spacers to receive charge air and to distribute the charge air to flow paths defined between adjacent plate pairs; and
securing a charge air outlet tank to the top plate, the bottom plate and the elongated spacers to receive the charge air from the flow paths
wherein the elongated spacers are located along a first edge of the stack of plate pairs, the method further comprising the acts of:
locating a side plate adjacent a second edge of the stack of plate pairs opposite the first edge;
securing the side plate to the top plate and the bottom plate;
securing the charge air inlet tank to the side plate; and
securing the charge air outlet tank to the side plate; and
further comprising positioning a corrugated fin between two of the plate pairs and along the charge air flow path, wherein locating the side plate includes compressing at least one convolution of the corrugated fin.

18. The heat exchanger of claim 1, wherein the housing defines a core in which heat is transferred between a fluid in the first flow path and a fluid in the second flow path, and wherein each plate pair defines a perimeter that is fluidly sealed such that the second flow path is positioned within the core.

19. The heat exchanger of claim 1,
wherein the first wall located along a first edge of the stack of plate pairs,
wherein the housing further includes a side wall adjacent a second edge of the stack of plate pairs opposite the first edge,
wherein the second inlet tank is secured to the first wall and the side wall, and
wherein the second outlet tank is secured to the first wall and the side wall.

20. The heat exchanger of claim 19, wherein the second inlet tank is secured to the first wall and the side plate by a continuous welded joint extending around a periphery of the second inlet tank.

21. The heat exchanger of claim 1,
wherein the housing further includes a top plate and a bottom plate,
wherein the second inlet tank is secured to the top plate and the bottom plate, and
wherein the second outlet tank is secured to the top plate and the bottom plate.

22. The heat exchanger of claim 1, wherein at least one of the plates of each plate pair includes a dimple positioned between the plates to form a turbulator positioned along the second flow path.

23. The heat exchanger of claim 1, wherein at least one of the plates of each embossed plate pair includes an arcuately-shaped embossment at least partially defining a serpentine flow path.

24. The heat exchanger of claim 1, wherein each spacer extends along an edge of one of the plates, and wherein an opposite edge of the one plate is sealed.

* * * * *